United States Patent
Moro et al.

(10) Patent No.: US 9,098,016 B2
(45) Date of Patent: Aug. 4, 2015

(54) ROLLER, DEVELOPING ROLLER, DEVELOPING DEVICE, PROCESS CARTRIDGE, AND IMAGE FORMING APPARATUS

(71) Applicants: Yuki Moro, Kanagawa (JP); Noriyuki Kamiya, Kanagawa (JP); Hiroya Abe, Kanagawa (JP); Masashi Nakayama, Kanagawa (JP); Soichiro Fukutomi, Kanagawa (JP); Rei Suzuki, Kanagawa (JP); Takashi Innami, Kanagawa (JP); Yuusuke Arai, Kanagawa (JP)

(72) Inventors: Yuki Moro, Kanagawa (JP); Noriyuki Kamiya, Kanagawa (JP); Hiroya Abe, Kanagawa (JP); Masashi Nakayama, Kanagawa (JP); Soichiro Fukutomi, Kanagawa (JP); Rei Suzuki, Kanagawa (JP); Takashi Innami, Kanagawa (JP); Yuusuke Arai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/284,627

(22) Filed: May 22, 2014

(65) Prior Publication Data
US 2014/0356031 A1 Dec. 4, 2014

(30) Foreign Application Priority Data

May 30, 2013 (JP) .................................. 2013-113640
Nov. 7, 2013 (JP) .................................. 2013-230984

(51) Int. Cl.
*G03G 15/08* (2006.01)
*G03G 21/18* (2006.01)
*F16C 13/00* (2006.01)

(52) U.S. Cl.
CPC ............ *G03G 15/0865* (2013.01); *F16C 13/00* (2013.01); *G03G 21/18* (2013.01)

(58) Field of Classification Search
CPC . F16C 13/00; G03G 15/0808; G03G 15/0935
See application file for complete search history.

(56) References Cited

U.S. PATENT DOCUMENTS

| | | | | |
|---|---|---|---|---|
| 6,139,298 | A | * | 10/2000 | Kojima et al. ................. 418/152 |
| 7,450,892 | B2 | * | 11/2008 | Tsubota et al. ................ 399/286 |
| 2009/0143208 | A1 | * | 6/2009 | Leger ............................... 492/45 |
| 2009/0232563 | A1 | | 9/2009 | Innami et al. |
| 2010/0067959 | A1 | | 3/2010 | Ohsawa et al. |
| 2012/0294655 | A1 | | 11/2012 | Terasaka et al. |

FOREIGN PATENT DOCUMENTS

| | | |
|---|---|---|
| JP | 06-324609 | 11/1994 |
| JP | 07-020674 | 1/1995 |
| JP | 09-086712 | 3/1997 |
| JP | 2000-019848 | 1/2000 |

* cited by examiner

*Primary Examiner* — Gregory H Curran
(74) *Attorney, Agent, or Firm* — Cooper & Dunham LLP (57) ABSTRACT

A roller includes a cylindrical body having openings on both ends thereof and a press-fit member fitted in at least one of the openings of the cylindrical body with an outer circumferential face thereof in contact with an inner face of the cylindrical body. The outer circumferential face of the press-fit member is grooved obliquely to an axis of the cylindrical body, and the inner face of the cylindrical body is smooth at least in a portion that contacts the outer circumferential face of the press-fit member.

8 Claims, 4 Drawing Sheets

ROLLER, DEVELOPING ROLLER, DEVELOPING DEVICE, PROCESS CARTRIDGE, AND IMAGE FORMING APPARATUS

CROSS-REFERENCE TO RELATED APPLICATION

This patent application is based on and claims priority pursuant to 35 U.S.C. §119 to Japanese Patent Application Nos. 2013-113640, filed on May 30, 2013, and 2013-230984, filed on Nov. 7, 2013, in the Japan Patent Office, the entire disclosure of each of which is hereby incorporated by reference herein.

BACKGROUND OF THE INVENTION

1. Technical Field

Embodiments of the present invention generally relate to a roller including a cylindrical body and a press-fit member fitted in at least one of openings at both ends of the cylindrical body, and a developing roller including the cylindrical body and the press-fit member; and further relate to a developing device, a process cartridge, and an image forming apparatus including the developing roller.

2. Description of the Background Art

Conventionally, image forming apparatuses, such as copiers, facsimile machines, printers, and multifunction machines (so-called multifunction peripherals or MFPs) having at least two of coping, printing, facsimile transmission, plotting, and scanning capabilities, employ a roller including a cylindrical body and a member (i.e., a press-fit member) fitted in at least one of openings of the cylindrical member by press-fit. Such rollers typically rotate upon application of driving force to the press-fit member, and rotational deviation or runout may arise in rotation of the roller if the center of rotation of the press-fit member is deviated from the axis of the cylindrical body.

For example, such rollers are used as developing rollers in image forming apparatuses. If runout in rotation of the developing roller is significant, density unevenness arises in image development, and density of images formed on sheets of recording media becomes uneven. Accordingly, it is preferred to precisely align the position of the center of rotation of the press-fit member with the axis of the cylindrical body to reduce the runout in rotation. Additionally, a relatively large amount of torque is loaded to the connection between the cylindrical body and the press-fit member at the start of rotation, and it is desirable that such rollers have a high degree of durability against the torque load.

There are various rollers having a cylindrical body and a press-fit member. For example, in JP-H06-324609-A, a groove parallel to the axis is provided in an inner face of the cylindrical body, and a projection to fit in the groove is formed on an outer circumferential face of the press-fit member. Additionally, in JP-H07-020674-A, a female screw is provided to the inner face of the cylindrical body, and a male screw to engage the female screw is provided to the outer circumferential face of the press-fit member. Yet additionally, in JP-H09-086712-A, a projection parallel to the axis is provided to the inner face of the cylindrical body to fit in a groove in the outer circumferential face of the press-fit member, and connection therebetween is enhanced using glue.

SUMMARY OF THE INVENTION

In view of the foregoing, one embodiment of the present invention provides a roller that includes a cylindrical body, and a press-fit member fitted in at least one of openings on both ends of the cylindrical body. An outer circumferential face of the press-fit member that contacts an inner face of the cylindrical body is grooved obliquely to an axis of the cylindrical body, and the inner face of the cylindrical body is smooth at least in a portion that contacts the outer circumferential face of the press-fit member.

In another embodiment, a developing roller includes the cylindrical body and the press-fit member described above.

In yet another embodiment, the developing roller described above is incorporated in a developing device to develop an electrostatic latent image on an image bearer with developer.

In yet another embodiment, the developing device is incorporated in a process cartridge that is removably installed in an apparatus body.

In yet another embodiment, an image forming apparatus includes an image bearer on which an electrostatic latent image is formed and the above-described developing device.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In rollers in which a press-fit member is fitted in a cylindrical body using a projection and a groove parallel to the axis, a female screw and a male screw, or the like, in addition to a high degree of processing accuracy, a high degree of accuracy is required in aligning the projection with the groove, or the female screw with the male screw. Thus, assembling is complicated.

If the positioning accuracy is low, it is possible that runout in rotation of the roller is significant. Additionally, in the case of the rollers using grooves or projections parallel to the axis in fitting the press-fit member in the cylindrical body, during the rotation, torque in the direction perpendicular to the grooves or projections is loaded as is to the grooves or projections. Thus, the durability against the torque load may be low. Further, when the durability of the roller is enhanced with glue, use of the roller as a developing roller is not preferred since there is a risk that glue adheres to the circumferential face of the developing roller, on which developer is borne.

In view of the foregoing, an aim of the embodiments described below is to provide a roller and a developing roller capable of suppressing runout in rotation and having enhanced durability against torque load without using glue; and to provide a developing device, a process cartridge, and an image forming apparatus incorporating the developing roller.

Figure 1:
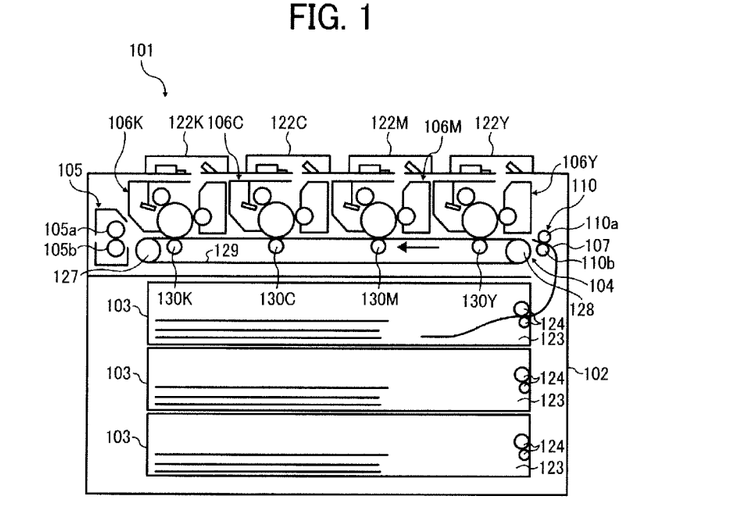
FIG. 1 is a front view of an image forming apparatus according to an embodiment.

Referring now to the drawings, wherein like reference numerals designate identical or corresponding parts throughout the several views thereof, and particularly to FIG. 1, a multicolor image forming apparatus according to an embodiment of the present invention is described.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary, and the term "cylindrical" used in this specification is not limited to round columns but also includes polygonal prisms.

FIG. 1 is a front view of an image forming apparatus according to the present embodiment. FIG. 1 is an end-on axial view of a developing device installed in the image forming apparatus shown in FIG. 1. FIG. 3 is a cross-sectional view along line A-A shown in FIG. 2.

An image forming apparatus 101 shown in FIG. 1 forms multicolor images on sheets 107 of recording media by superimposing yellow (Y), magenta (M), cyan (C), and black (K) single color images one on another.

Referring to FIG. 1, the image forming apparatus 101 includes an apparatus body 102, sheet feeding units 103, a pair of registration rollers 110a and 110b (hereinafter collectively "registration rollers 110"), a transfer unit 104, a fixing device 105, multiple laser writing units 122Y, 122M, 122C, and 122K, and multiple process cartridges 106Y, 106M, 106C, and 106K.

The apparatus body 102 is shaped like a box, and is installed on a floor, for example. The apparatus body 102 contains the sheet feeding units 103, the pair of registration rollers 110, the transfer unit 104, the fixing device 105, the multiple laser writing units 122Y, 122M, 122C, and 122K, and the multiple process cartridges 106Y, 106M, 106C, and 106K.

For example, the multiple sheet feeding units 103 are provided in a lower portion of the apparatus body 102. The sheet feeding unit 103 includes a sheet tray 123 for containing multiple sheets 107 that can be pulled out from and retracted into the apparatus body 102 and a feed roller 124. The feed roller 124 is pressed against the sheet 107 on the top in the sheet tray 123. The feed roller 124 picks up and feeds the sheet 107 on the top to the pair of registration rollers 110.

The pair of registration rollers 110 is positioned in a conveyance path through which the sheet 107 is fed from the sheet feeding unit 103 to the transfer unit 104. The pair of registration rollers 110 clamps the sheet 107 therein and forwards the sheet 107 to nips between the process cartridges 106 and the transfer unit 104, timed to coincide with the arrival of the image to be transferred onto the sheet 107.

The transfer unit 104 is positioned above the sheet feeding units 103. The transfer unit 104 includes a driving roller 127, a driven roller 128, a conveyance belt 129, and transfer rollers 130Y, 130M, 130C, and 130K. The driving roller 127 is positioned on a downstream side in a sheet conveyance direction and driven by a driving source such as a motor. The driven roller 128 is rotatably supported by the apparatus body 102 and positioned on an upstream side in the sheet conveyance direction. The conveyance belt 129 is an endless belt and stretched around the driving roller 127 and the driven roller 128. As the driving roller 127 rotates, the conveyance belt 129 rotates around the driving roller 127 and the driven roller 128 counterclockwise in the drawing.

Each transfer roller 130 presses the conveyance belt 129 and the sheet 107 carried thereon against the photoreceptor drum 108 of the corresponding process cartridge 106. The transfer rollers 130 press the sheet 107 against the outer faces of the photoreceptor drums 108 of the respective process cartridges 106, thereby transferring the toner images from the photoreceptor drums 108 onto the sheet 107. Then, the transfer unit 104 forwards the sheet 107 to the fixing device 105.

The fixing device 105 is positioned downstream from the transfer unit 104 in the sheet conveyance direction and includes a pair of rollers 105a and 105b. The fixing device 105 clamps the sheet 107 between the rollers 105a and 105b and fixes the toner image on the sheet 107 with heat and pressure. Thus, the toner image transferred from the photoreceptor drum 108 is fixed on the sheet 107.

The laser writing units 122 are attached to an upper portion of the apparatus body 102 and provided for the process cartridges 106Y, 106M, 106C, and 106K, respectively. Each laser writing unit 122 directs a laser beam onto the surface of the photoreceptor drum 108 in the corresponding process cartridge 106, thus forming an electrostatic latent image, after a charging roller 109 charges the surface of the photoreceptor drum 108 uniformly.

The process cartridges 106 are positioned between the transfer unit 104 and the respective laser writing units 122. The process cartridges 106 are removably insertable into the apparatus body 102 and disposed parallel to each other in the direction in which the sheet 107 is transported.

Figure 2:
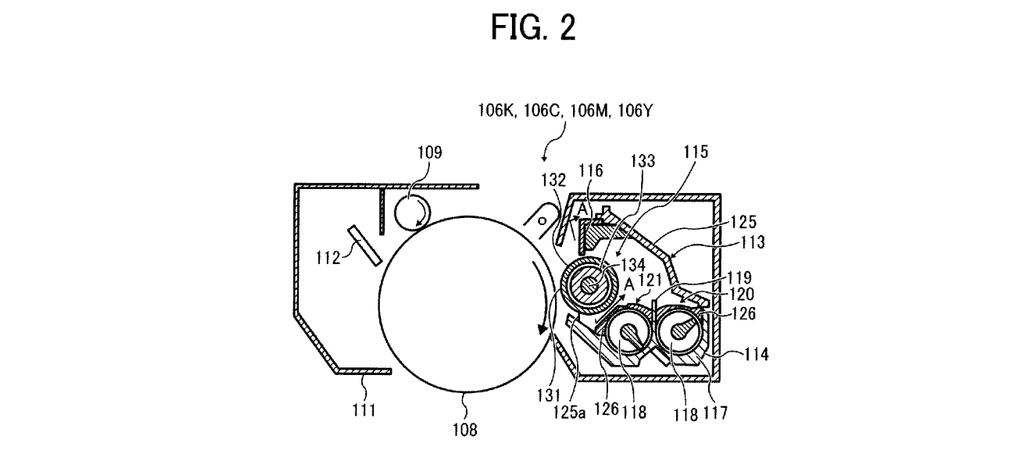
FIG. 2 is an end-on axial view of a developing device according to an embodiment, installed in the image forming apparatus shown in FIG. 1.
Figure 3:
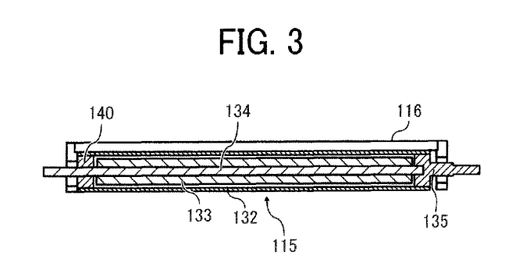
FIG. 3 is a cross-sectional view along line A-A shown in FIG. 2.

As shown in FIG. 2, each process cartridge 106 includes a cartridge casing 111 and the photoreceptor drum 108. Around the photoreceptor drum 108, the charging roller 109 serving as a charging member, a cleaning blade 112 serving as a cleaning member, and a developing device 113 are disposed. The photoreceptor drum 108 serves as an image bearer.

It is to be noted that, in FIG. 2, reference numeral 126 represents developer.

The cartridge casing 111 is removably insertable into the apparatus body 102 and houses the photoreceptor drum 108, the charging roller 109, the cleaning blade 112, and the developing device 113. The charging roller 109 charges the surface of the photoreceptor drum 108 uniformly. The photoreceptor drum 108 is positioned across a gap from a developing roller 115 of the developing device 113. The photoreceptor drum 108 is shaped like a round or polygonal column and rotatable about an axis. On the surface of the photoreceptor drum 108, an electrostatic latent image is formed by the corresponding laser writing unit 122. The developing device 113 develops the electrostatic latent image into a toner image, which is transferred onto the sheet 107 on the conveyance belt 129. The cleaning blade 112 removes toner remaining on the surface of the photoreceptor drum 108 after image transfer. As shown in FIG. 2, the developing device 113 includes a casing 125, a developer supply unit 114, the developing roller 115 serving as a developer bearer, and a doctor blade 116 serving as a developer regulator. The developing roller 115 serves as a developer bearer and also as a roller.

The developer supply unit 114 includes a developer container 117 and a pair of agitation screws 118. For example, the developer container 117 is shaped like a box and has an axial length (i.e., a length in its longitudinal direction) equal or similar to an axial length of the photoreceptor drum 108. Additionally, a partition 119 extending in the longitudinal direction of the developer container 117 is provided inside the developer container 117. The partition 119 divides the developer container 117 into a first compartment 120 and a second compartment 121 that communicate with each other in both end portions in the longitudinal direction.

Developer is contained in both the first compartment 120 and the second compartment 121 of the developer container 117. The developer used in the present embodiment is two-component developer consisting essentially of toner particles and magnetic particles (also "magnetic powder"). Toner is supplied as required to one of axial end portions of the first compartment 120, which is positioned farther from the developing roller 115 than the second compartment 121 is. For example, toner particles are spherical fine particles produced through an emulsion polymerization method or a suspension polymerization method. It is to be noted that, alternatively, toner may be produced by smashing synthetic resin blocks in which various colorants and pigments are mixed or dispersed. The toner particles have a mean particle diameter of within a range from about 3 μm to 7 μm. The magnetic carrier is contained in both the first and second compartments 120 and 121. The magnetic carrier particles have a mean particle diameter of within a range from about 20 μm to 50 μm.

The agitation screws 118 are provided in the first and second compartments 120 and 121, respectively. The long axes of the agitation screws 118 parallel the longitudinal direction of the developer container 117, the developing roller 115, and the photoreceptor drum 108. Each agitation screw 118 is rotatable about an axis of rotation. Each agitation screw 118 mixes the toner with the magnetic carrier and transports the developer in the axial direction while rotating. In the configuration shown in the figures, the agitation screw 118 in the first compartment 120 transports the developer from the axial end portion to which the toner is supplied to the other axial end portion. The agitation screw 118 in the second compartment 121 transports the developer in the direction opposite the direction in which the developer is transported (hereinafter "developer conveyance direction") in the first compartment 120. In the developer supply unit 114, developer is circulated between the first compartment 120 and the second compartment 121. While being transported in the axial direction inside the second compartment 121, developer is supplied onto the surface of the developing roller 115.

The casing 125 is box-shaped and is attached to the developer container 117 of the developer supply unit 114. The casing 125 and the developer container 117 together cover the developing roller 115 and the like. Additionally, an opening 125a is provided in a portion of the casing 125 facing the photoreceptor drum 108.

The developing roller 115 is columnar and is positioned between the second compartment 121 and the photoreceptor drum 108, adjacent to the opening 125a. The developing roller 115 parallels both the photoreceptor drum 108 and the developer container 117. As described above, the developing roller 115 is positioned across the predetermined gap from the photoreceptor drum 108. The gap between the developing roller 115 and the photoreceptor drum 108 serves as a development range 131 where the toner in the developer adheres to the photoreceptor drum 108, thus developing the electrostatic latent image formed thereon into a toner image. The developing roller 115 faces the photoreceptor drum 108 in the development range 131.

As shown in FIGS. 2 and 3, the developing roller 115 includes a metal core 134, a cylindrical magnet roller 133 (also "magnet body"), a hollow, cylindrical developing sleeve 132, and two press-fit members 135 and 140. The metal core 134 is positioned with its longitudinal direction in parallel to that of the photoreceptor drum 108 and is attached to the casing 125. The metal core 134 does not rotate, that is, its position is fixed relative to the casing 125. The press-fit members 135 and 140 are fitted in both ends of the developing sleeve 132. The developing sleeve 132 shown in FIG. 3 serves as a cylindrical body.

The magnet roller 133 is constructed of a magnetic material and cylindrical. Multiple stationary magnetic poles are provided to the magnet roller 133. The magnet roller 133 is provided outside an outer circumferential surface of the metal core 134. The magnet roller 133 does not rotate, that is, its position is fixed relative to the metal core 134 or the casing 125.

For example, the stationary magnetic poles of the magnet roller 133 are constituted of multiple magnets shaped like long bars and attached to the magnet roller 133. The magnets extend in the longitudinal direction of the magnet roller 133, that is, the longitudinal direction of the developing roller 115, over the entire longitudinal length of the magnet roller 133, for example. The magnet roller 133 is contained inside the developing sleeve 132.

One of the stationary magnetic poles faces the agitation screw 118 and serves as a developer scooping pole. More specifically, the developer scooping pole generates magnetic force on the developing sleeve 132, that is, the outer surface of the developing roller 115 for adsorbing the developer contained in the second compartment 121 of the developer container 117 onto the surface of the developing sleeve 132.

Another one of the stationary magnetic poles faces the photoreceptor drum 108 and serves as a development pole that exerts a magnetic force on the outer surface of the developing sleeve 132, thereby generating a magnetic field for image development between the developing sleeve 132 and the photoreceptor drum 108. The magnetic field generated by the development pole causes the developer to form magnetic brushes, thereby transferring the toner particles in the developer from the surface of the developing sleeve 132 to the photoreceptor drum 108.

At least one more stationary magnetic pole is present between the developer scooping pole and the development pole. The magnetic pole positioned between the developer scooping pole and the development pole serves as a developer conveyance pole for generating a magnetic force on the surface of the developing sleeve 132 (developing roller 115) for transporting the developer (developer before development) toward the photoreceptor drum 108 and for transporting the developer (developer after development) collected from the photoreceptor drum 108 to the developer container 117.

The developer scooping pole causes the magnetic carrier particles to stand on end on the developing sleeve 132 along the lines of magnetic force generated by the stationary magnetic pole after scooping the developer onto the outer surface of the developing sleeve 132. The state in which magnetic carrier particles are stacked one on another along the magnetic force lines and stand on end on the outer surface of the developing sleeve 132 may be defined as "standing on end like ears of wheat on the outer surface of the developing sleeve 132". Toner adheres to magnetic carrier due to triboelectric charging attained by agitation in the developer supply unit 114. In other words, due to the magnetic force exerted by the magnet roller 133, developer including toner is adsorbed as a whole onto the developing sleeve 132 and stands on end thereon.

The developing sleeve 132 containing the magnet roller 133 is supported by the casing 125, for example, rotatably about the axis of rotation so that its inner circumferential face faces the multiple stationary magnetic poles sequentially. The developing sleeve 132 is constructed of nonmagnetic material such as aluminum alloy, brass, stainless steel, or conductive resin. The outer surface of the developing sleeve 132 is roughened. Aluminum alloy excels in its lightness and easiness in processing. A6063, A5056, or A3003 is preferable as aluminum alloy. When stainless steel is used, SUS303, SUS304, or SUS316 is preferable. In the configuration shown in the figures, the developing sleeve 132 is constructed of aluminum alloy. The developing sleeve 132 is preferably has an external diameter from about 14 mm to about 30 mm and an axial length from about 300 mm to about 370 mm.

The doctor blade 116 is provided in an end portion of the developing device 113, on the side of the photoreceptor drum 108. The doctor blade 116 is attached to the casing 125 at a position across a gap from the surface of the developing sleeve 132. The doctor blade 116 removes the developer from the developing sleeve 132 when the amount is excessive, that is, the thickness exceeds a predetermined thickness, and returns the excessive developer to the developer container 117, thereby adjusting the amount of developer conveyed to the development range 131.

In the developing device 113, toner and magnetic carrier are agitated sufficiently in the developer supply unit 114, and developer is attracted to the surface of the developing sleeve 132 by the magnetic force exerted by the stationary magnetic poles. The developing sleeve 132 rotates and conveys the developer attracted to the surface thereof by the multiple magnetic poles to the development range 131. Then, the doctor blade 116 adjusts the thickness of a layer of developer carried on the developing sleeve 132, and then the developer is adsorbed to the photoreceptor drum 108, developing the electrostatic latent image. Thus, developer is carried on and transported by the developing roller 115 to the development range 131, and then develops the latent image formed on the photoreceptor drum 108 into the toner image.

Further, the developer used in image development is separated from the developing sleeve 132 and returned to the developer container 117. The used developer is agitated with the developer contained in the second compartment 121 of the developer container 117 and is again used to develop the latent image formed on the photoreceptor drum 108.

In the image forming apparatus 101, images can be formed as follows.

Initially, the photoreceptor drum 108 starts rotating, and the charging roller 109 charges the surface of the photoreceptor drum 108 uniformly to −700 V, for example. Then, the laser writing unit 122 directs the laser beam onto the surface of the photoreceptor drum 108, thus attenuating the absolute value of potentials on the exposed portion (i.e., image portion) to an electrical potential of −150 V, for example. Accordingly, electrostatic latent images are formed on the respective photoreceptor drums 108. When the latent image is conveyed to a development range 131 (shown in FIG. 2) as the photoreceptor drum 108 rotates, a development bias of −550 V, for example, is applied to the latent image, thereby transferring the developer carried on the developing sleeve 132 of the developing device 113 to the photoreceptor drum 108. Thus, the latent image formed thereon is developed into a toner image.

The sheet 107 is transported from the sheet feeding unit 103 to positions between the photoreceptor drums 108 and the conveyance belt 129 of the transfer unit 104, and the toner images formed on the outer surfaces of the photoreceptor drums 108 are transferred onto the sheet 107. Subsequently, the image is fixed by the fixing device 105 on the recording sheet 107, and thus the image forming apparatus 101 forms the multicolor image thereon.

Meanwhile, toner remaining on the photoreceptor drum 108 is removed by the cleaning blade 112, and the photoreceptor drum 108 is initialized by a discharge lamp and prepared for subsequent image formation.

Additionally, the image forming apparatus 101 performs process control for reducing fluctuations in image quality due to changes in environmental conditions, deterioration of the components or developer over time, and the like. More specifically, the developability of the developing device 113 is detected. For example, a given toner patient is formed on the photoreceptor drum 108 with the development bias kept constant, and the toner pattern is detected with a toner density sensor. The developability can be recognized based on changes in image density of the toner pattern. Image quality can be kept constant by adjusting a target value of density of toner so that the developability is adjusted to a predetermined target value. For example, if the density of the toner pattern detected by the toner density sensor is lower than the target image density, a controller such as a central processing unit (CPU) controls driving circuitry of a motor that drives the agitation screw 118 to increase the density of toner. By contrast, if the image density of the toner pattern detected by the toner density sensor is higher than the target image density, the controller controls the driving circuitry of the motor to reduce the density of toner.

Descriptions are given below of the developing roller 115.

Figure 4A:
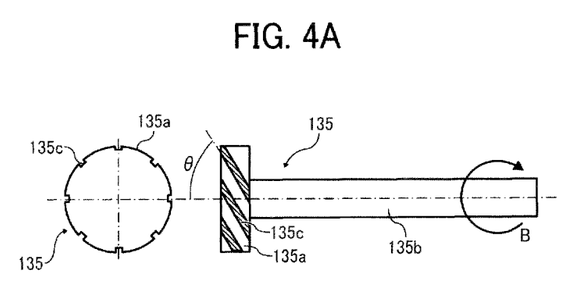
FIGS. 4A and 4B illustrate press-fit members fitted in both ends of a cylindrical body, respectively, according to an embodiment.
Figure 4B:
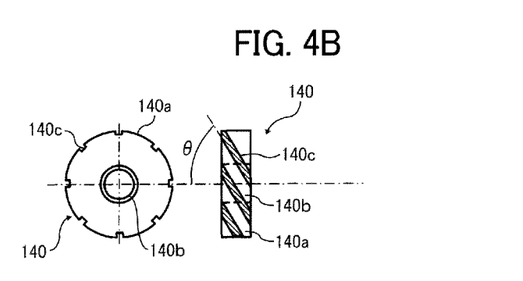

The two press-fit members 135 and 140 are attached inside the openings on both ends of the cylindrical developing sleeve 132 by press-fitting as shown in FIGS. 4A and 4B.

FIG. 4A illustrates the press-fit member 135 on the right in FIG. 3, and FIG. 4B illustrates the press-fit member 140 on the left in FIG. 3.

The press-fit member 135 shown in FIG. 4A includes a columnar body 135a and a shall portion 135b that are coaxial with each other. The columnar body 135a and the shaft portion 135b are respectively on a leading side and a trailing side in a direction in which the press-fit member 135 is fitted in the developing sleeve 132 (hereinafter "fitting-in direction"). An outer circumferential face of the columnar body 135a that contacts an inner face of the developing sleeve 132 is grooved obliquely to the axis of the developing sleeve 132 with eight grooves 135c oblique to the axis. Rotational driving force is applied via a gear to the shaft portion 135b to rotate the developing roller 115 shown in FIG. 3 in the direction indicated by arrow B shown in FIG. 4A centered on a center axis that is substantially coaxial with the axis of the developing sleeve 132.

By contrast, the entire press-fit member 140 shown in FIG. 4B is constructed of a columnar body 140a. A through hole 140b is in a center portion of the columnar body 140a and penetrated by the metal core 134 to which the magnet roller 133 is attached. The metal core 134 penetrates the developing sleeve 132 entirely from the leading side to the trailing side in the fitting-in direction. Similarly, an outer circumferential face of the columnar body 140a that contacts the inner face of the developing sleeve 132 is grooved obliquely with eight grooves 140c oblique to the axial direction.

To equally distribute the load to the grooves 135c and 140c, it is preferable that the grooves 135c and 140c are in a circlesymmetric arrangement with respect to the circular shape of the columnar body 135a and the columnar body 140a. Additionally, the grooves 135c and 140c are preferably at an angle θ in a range from about 30° to about 60° from the axis. The grooves 135c and 140c may be V-shaped, U-shaped, quadrangular, or trapeziform, or semicircular. The grooves 135c and 140c are examples of an oblique groove according to the present embodiment.

Additionally, in the present embodiment, the grooves 135c and 140c are oblique to the axis so that, when the driving force in the direction indicated by arrow B is transmitted to the shaft portion 135b, the direction of rotation becomes a closing direction to enter the columnar body 135a and the columnar body 140a into the developing sleeve 132.

Figure 5:
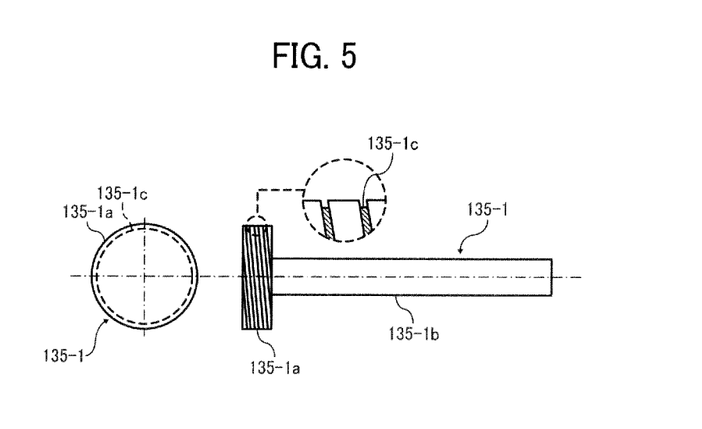
FIG. 5 illustrates a variation of the press-fit members different in groove structure from those shown in FIGS. 4A and 4B.

It is to be noted that, although the eight grooves 135c and the eight grooves 140c are provided in the configuration shown in FIGS. 4A and 4B, the structure of the grooves is not limited thereto, and other structures such as the one shown in FIG. 5 can be used.

FIG. 5 illustrates a variation of the press-fit members different in groove structure from those shown in FIGS. 4A and 4B.

FIG. 5 illustrates a press-fit member 135-1 that is equivalent to the press-fit member 135 shown in FIG. 4A.

The press-fit member 135-1 includes a columnar body 135-1a and a shaft portion 135-1b, and an outer circumferential face of the columnar body 135-1a that contacts the inner face of the developing sleeve 132 is grooved obliquely with a single spiral groove 135-1c. The spiral groove 135-1c is similarly oblique to the axis so that the direction of rotation of the rotational driving force given to the shaft portion 135-1b becomes the closing direction to enter the columnar body 135-1a into the developing sleeve 132. It is to be noted that the number of spiral grooves is not limited to one as shown in FIG. 5, and, alternatively, multiple spiral grooves may be provided.

The spiral groove 135-1c shown in FIG. 5 is advantageous over the multiple independent grooves 135c or 140c shown in FIGS. 4A and 4B in that the processing is simpler and easier.

Now, the developing roller 115 shown in FIG. 3, provided with the press-fit members 135 and 140 are described in further detail.

Figure 6:
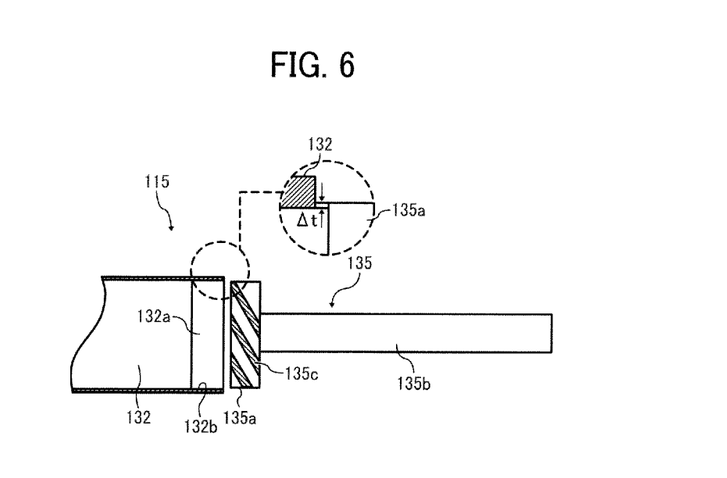
FIG. 6 is a diagram for understanding of fitting the press-fit members into a developing sleeve according to an embodiment.

FIG. 6 is a diagram for understanding of fitting the press-fit members 135 and 140 into the developing sleeve 132.

In FIG. 6, reference character 132a represents a portion of the inner face of the developing sleeve 132 that contacts the outer circumferential face of the columnar body 135a including the grooves 135c. An entire inner face of the developing sleeve 132 including the portion 132a is smooth without grooves, for example in the configuration shown in FIG. 6.

As shown in FIG. 6, the columnar body 135a has an outer diameter greater than an inner diameter of the developing sleeve 132 by a press-fit margin Δt. The columnar body 135a of the press-fit member 135 is pressed into an opening 132b of the developing sleeve 132.

From the viewpoint of strength of connection between the developing sleeve 132 and the press-fit member 135, the press-fit margin Δt is preferably large. However, if the press-fit margin Δt is extremely large, the load applied to the connection between the developing sleeve 132 and the press-fit member 135 during press-fitting becomes extremely large. Considering both of the connection strength and the load at the time of press-fitting, the press-fit margin Δt is preferably from 5 μm to 40 μm, and, more preferably, from 8 μm to 35 μm. Especially, the press-fit margin Δt is preferably from 10 μm to 30 μm.

In the present embodiment, the press-fit margin Δt is from 10 μm to 30 μm. With this configuration, while maintaining a desired degree of connection strength between the developing sleeve 132 and the press-fit member 135, the load applied to the connection during press-fitting can be suppressed at a certain degree. Although the reduced load still causes deflection or deformation of the developing sleeve 132, the grooves 135c can absorb the deflection or deformation. Thus, deflection, deformation, and galling of the developing sleeve 132 caused by the load during press-fitting can be suppressed, and accuracy in relative positions of the developing sleeve 132 and the press-fit member 135 can be enhanced.

Therefore, the developing roller 115 can be assembled with the developing sleeve 132 and the press-fit member 135 kept coaxial with each other with a higher degree of accuracy. Additionally, in the connection between the developing sleeve 132 and the press-fit member 135, the face of the developing sleeve 132 is smooth. In this configuration, the press-fit member 135 is simply pressed into the developing sleeve 132. For example, although it is necessary to align the groove with the projection in a configuration in which the projection on the developing sleeve 132 is fitted in the groove of the press-fit member 135, the present embodiment can obviate such alignment. Obviating such alignment contributes to improvement in the relative position accuracy between the developing sleeve 132 and the press-fit member 135. As a result, the runout in rotation of the developing roller 115 can be suppressed in the present embodiment.

Additionally, a relatively large amount of torque is loaded to the connection between the developing sleeve 132 and the press-fit member 135 at the start of rotation of the developing roller 115. In the present embodiment, since the grooves 135c are oblique to the axis of the developing sleeve 132, the torque loaded to the connection between the developing sleeve 132 and the press-fit member 135 can be dispersed along the oblique grooves 135c. Accordingly, the torque loaded to the connection can be alleviated. Thus, the durability against the torque load can be enhanced without using glue.

Additionally, as described above, the grooves 135c are oblique to the axis so that the direction of rotation of the rotational driving force given to the shaft portion 135h becomes the closing direction. Accordingly, the connection strength between the developing sleeve 132 and the press-fit member 135 can be enhanced during the rotation. Therefore, the present embodiment can further enhance the durability against the torque loaded to the connection between the developing sleeve 132 and the press-fit member 135.

Although the description above concerns press-fitting of the press-fit member 135 (on the right in FIG. 3) into the developing sleeve 132, the press-fit member 140 (on the left in FIG. 3) is fitted into the developing sleeve 132 in a similar manner.

With the above-described configurations, the developing roller 115 according to the present embodiment can have a higher degree of accuracy and maintain the higher degree of accuracy for a long time. Accordingly, the developing roller 115 contributes to desirable image formation for a long time in addition to immediately after the start of image formation.

It is to be noted that, although the description above concerns the developing roller 115, embodiments of the roller is not limited thereto, and various aspects of the present invention are applicable to other rollers such as sheet conveyance rollers, rollers used in the fixing device, the photoreceptor drum, the charging roller, and the like.

Descriptions are given below of embodiments 1 through 8 in which image formation was executed using the image forming apparatus incorporating the developing roller equivalent to the above-described embodiment and comparative examples.

It is to be noted that specified dimensions and materials of the developing roller described below are just examples, and embodiments of the present invention are not limited thereto.

Embodiment 1

A developing roller used in embodiment 1 includes the right and left press-fit members 135 and 140, in which the grooves 135c and 140c oblique to the axial direction are in outer circumferential face of the columnar bodies 135a and 140a as shown in FIGS. 4A and 4B. The dimensions and the material of the developing roller in embodiment 1 are as follows.

The developing sleeve 132 is constructed of aluminum and has an outer diameter of 30.2 mm, an inner diameter of 28.58 mm. The press-fit member 135 (shown in FIG. 4A) used in embodiment 1 is a stainless steel press-fit member, the columnar body 135a has a width of 8 mm and a diameter of 28.64 mm, and the shaft portion 135b has a length of 78 mm. In the press-fit member 135 in embodiment 1, the deviation between the center axis of the columnar body 135a and the center axis of the shaft portion 135b is 1 μm or smaller. The eight grooves 135c in the outer circumferential face of the shaft portion 135h are angular grooves each having a width of 5 mm, a depth of 1 mm, and an angle of 45° from the axial direction. Additionally, these grooves 135c are oblique to the axis so that the direction of rotation of the developing roller becomes a closing direction to enter the columnar body 135a into the developing sleeve 132. At that time, the margin of press-fitting of the columnar body 135a relative to the inner diameter of the developing sleeve 132 is 30 μm.

Additionally, the press-Fit member 140 (shown in FIG. 4B) used in embodiment 1 is a columnar (i.e., the columnar body 140a), constructed of stainless steel, and has a width of 8 mm and a diameter of 28.64 mm. The right and left press-fit members 135 and 140 were pressed in and fitted in the developing sleeve 132 so that the columnar bodies 135a and 140a was inserted therein over the entire width of 8 mm.

Additionally, changes in runout of rotation of the developing sleeve 132 before and after press-fitting of the press-fit members 135 and 140 were measured.

Figure 7A:
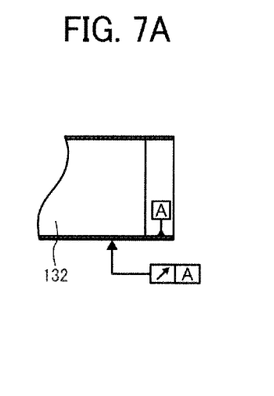
FIGS. 7A and 7B are diagrams for understanding of measurement of changes in runout of rotation of the developing sleeve before and after the press-fit members are press-fitted according to embodiments and comparative examples.
Figure 7B:
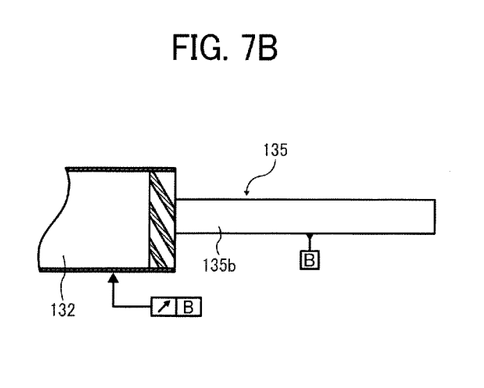

FIGS. 7A and 8B are diagrams for understanding of measurement of changes in runout of rotation of the developing sleeve 132 before and after press-fitting of the press-fit members 135 and 140. It is to be noted that, in the measurement of changes in runout shown in FIGS. 7A and 7B, the right press-fit member 135 shown in FIG. 4A is used as an example. FIG. 7A illustrates the runout of the developing sleeve 132 before the press-fitting, and FIG. 7B illustrates the runout of the developing sleeve 132 after the press-fitting.

As shown in FIG. 7A, before the press-fitting of the press-fit member and the press-fit member 140), the inner face of the developing sleeve 132 was used as datum A, and the runout of a barrel portion of the developing sleeve 132 was measured using a predetermined instrument. As shown in FIG. 7B, after the press-fitting of the press-fit member 135 (and the press-fit member 140, the outer face of the shaft portion 135b of the press-fit member 135 was used as datum B, and the runout of the barrel portion of the developing sleeve 132 was measured using the predetermined instrument. The difference between them was calculated as the change in runout, and the calculated change in runout was evaluated according to the following three standards.

Excellent: 2 μm or smaller,
Good: 4 μm or greater, and
Bad: greater than 4 μm.

Additionally, using a predetermined torque measurement instrument, a torque was loaded to the connection between the developing sleeve 132 and the press-fit member 135 via the shaft portion 135h. Then, the torque load resulting in breakage of the connection was deemed the durability, and the durability is evaluated according to the following three standards.

Excellent: 4.5 Nm or greater,
Good: 4 Nm or greater, and
Bad: lower than 4 Nm

Next, a developing roller similar to that used in the evaluation of the change in runout and the durability against torque load was produced and installed in a commercial production printer RICOH Pro C901 from Ricoh Co. Ltd. Using cyan toner in the printer, solid images extending entirely in A3 size placed lengthwise were output. Subsequently, the developing roller was rotated 15,000 times (equivalent to feeding 100× $100^3$ sheets), after which image density unevenness was evaluated according to the following standards.

Good: No density unevenness is observed in the circumferential direction of the developing roller with eyes, and
Bad: density unevenness is observed in the circumferential direction of the developing roller with eyes.

Embodiment 2

A developing roller used in embodiment 2 is similar to that used in embodiment 1 except that the diameter of the columnar bodies 135a and 140a of the press-fit members 135 and 140 is 28.6 mm and the press-fit margin Δt of the columnar bodies 135a and 140a relative to the developing sleeve 132 is 10 μm. The change in runout, the durability against torque load, and image density unevenness were evaluated similarly Embodiment 3

A developing roller used in embodiment 3 is similar to that used in embodiment 2 except that the width of the grooves 135c and 140c in the columnar bodies 135a and 140a is 3 mm and the angle of the grooves 135c and 140c relative to the axial direction is 60°. The change in runout, the durability against torque load, and image density unevenness were evaluated similarly to embodiments 1 and 2.

Embodiment 4

A developing roller used in embodiment 4 is similar to that used in embodiment 2 except that the width of the grooves 135c and 140c in the columnar bodies 135a and 140a is 1 mm and the angle of the grooves 135c and 140c relative to the axial direction is 30°. The change in runout, the durability against torque load, and image density unevenness were evaluated similarly to embodiment 1.

Embodiment 5

A developing roller used in embodiment 5 is similar to that used in embodiment 2 except that the width of the grooves 135c and 140c in the columnar bodies 135a and 140a is 3 mm, the angle of the grooves 135c and 140c relative to the axial direction is 30°, and the number of the grooves 135c and 140c is four. The change in runout, the durability against torque load, and image density unevenness were evaluated similarly to embodiment 1.

Embodiment 6

A developing roller used in embodiment 6 is similar to that used in embodiment 2 except that the width of the grooves 135c and 140c in the columnar bodies 135a and 140a is 1 mm, the angle of the grooves 135c and 140c relative to the axial direction is 60°, and the number of the grooves 135c and 140c is four. The change in runout, the durability against torque load, and image density unevenness were evaluated similarly to embodiment 1.

Embodiment 7

A developing roller used in embodiment 7 includes right and left press-fit members similar to the press-fit member 135-1 shown in FIG. 5 provided with the single spiral groove 135-1c oblique to the axial direction. The single spiral groove 135-1c has a width of 0.5 mm, a depth of 1 mm, and a pitch of 1.5 mm and is in the outer circumferential face of the columnar body 135-1a. Other than that, the dimensions and the material of the developing roller used in embodiment 7 is similar to that used in embodiment 1. The change in runout, the durability against torque load, and image density unevenness were evaluated similarly.

Embodiment 8

A developing roller used in embodiment 8 is similar to that used in embodiment 3 except that the diameter of the columnar bodies 135a and 140a of the press-fit members 135 and 140 is 28.6 mm and the press-fit margin Δt of the columnar bodies 135a and 140a relative to the developing sleeve 132 is 10 μm. The change in runout, the durability against torque load, and image density unevenness were evaluated similarly to embodiment 1.

Comparative Example 1

In comparative example 1, a developing roller was produced similar to that used in embodiment 1 except that the grooves were not in the outer circumferential face of the columnar bodies of the right and left press-fit members. The change in runout, the durability against torque load, and image density unevenness were evaluated similarly.

Comparative Example 2

A developing roller used in comparative example 2 is similar to that used in embodiment 1 except that two grooves perpendicular to the axial direction were present in the outer circumferential face of the columnar bodies of each of the right and left press-fit members, each groove is 2 mm in width and 1 in depth, and the press-fit margin Δt of the columnar bodies relative to the developing sleeve is 10 μm. The change in runout, the durability against torque load, and image density unevenness were evaluated similarly.

Comparative Example 3

A developing roller used in comparative example 3 is similar to that used in embodiment 1 except that eight grooves parallel to the axial direction were present in the outer circumferential face of the columnar body of each of the right and left press-fit members, each groove is 2 mm in width and 1 in depth, and the press-fit margin Δt of the columnar body relative to the developing sleeve is 10 μm. The change in runout, the durability against torque load, and image density unevenness were evaluated similarly.

[Evaluation Results]

Table 1 below shows evaluation results of the above-described embodiments 1 through 8 (E1 through E8 in table 1) and comparative examples 1 through 3 (C1 through C3 in table 1).

TABLE 1

| | | Groove | | | | | Image quality | |
|---|---|---|---|---|---|---|---|---|
| | Number | Width (mm) | Angle (°) | Δt (μm) | Change in runout | Torque durability | Initial | 100 × 10³ sheets |
| E1 | 8 | 5 | 45 | 30 | Good | Excellent | Good | Good |
| E2 | 8 | 5 | 45 | 10 | Excellent | Good | Good | Good |
| E3 | 8 | 3 | 60 | 10 | Excellent | Good | Good | Good |
| E4 | 8 | 1 | 30 | 10 | Excellent | Good | Good | Good |
| E5 | 4 | 3 | 60 | 10 | Excellent | Good | Good | Good |
| E6 | 4 | 1 | 30 | 10 | Excellent | Good | Good | Good |
| E7 | Spiral | | | 30 | Good | Excellent | Good | Good |
| E8 | Spiral | | | 10 | Good | Good | Good | Good |
| C1 | None | | | 30 | Bad | Good | Bad | — |
| C2 | 8 perpendicular grooves | | | 10 | Bad | Good | Bad | — |
| C3 | 8 parallel grooves | | | 10 | Good | Bad | Good | Bad |

As shown in table 1, in the developing roller according to embodiment 1, the change in runout can be reduce to 4 μm or smaller, and the durability against the torque load is 4.5 Nm or greater. When images were formed using the image forming apparatus incorporating the developing roller in embodiment 1, image quality was good without density unevenness in the circumferential direction both at an initial stage and after printing on 100×10³ sheets.

When the developing roller in embodiments 2 through 6 were used, the change in runout was limited to 2 μm or less and the durability against the torque load was 4 Nm or greater. When images were formed using the developing rollers in embodiments 2 through 6, in the respective embodiments, image quality was good without density unevenness in the circumferential direction both at the initial stage and after printing on 100×10³ sheets.

When the developing roller in embodiment 7 was used, the change in runout was limited to 4 μm or less and the durability against the torque load was 4.5 Nm or greater. When images were formed using the image forming apparatus incorporating the developing roller in embodiment 7, image quality was good without density unevenness in the circumferential direction both at the initial stage and after printing on $100 \times 10^3$ sheets.

When the developing roller in embodiment 8 was used, the change in runout was limited to 4 μm or less and the durability against the torque load was 4 Nm or greater. When images were formed using the image forming apparatus incorporating the developing roller in embodiment 8, image quality was good without density unevenness in the circumferential direction both at the initial stage and after printing on $100 \times 10^3$ sheets, By contrast, when the developing roller in comparative example 1 was used, the change in runout exceeded 4 μm although the durability against the torque load of 4 Nm or greater was attained. Additionally, in comparative example 1, such a large amount of change in runout caused density unevenness in the circumferential direction at the initial stage of image formation. Similarly, when the developing roller in comparative example 2 was used, the change in runout exceeded 4 μm although the durability against the torque load of 4 Nm or greater was attained. In comparative example 2, density unevenness in the circumferential direction arose at the initial stage of image formation. When the developing roller in comparative example 3 was used, the durability against the torque load was low and 2 Nm or lower although the change in runout was limited to 4 μm or less. In comparative example 3, density unevenness in the circumferential direction arose after printing on $100 \times 10^3$ sheets although density unevenness was not observed at the initial stage of image formation.

In each of embodiments 1 through 8 and the comparative examples 1 through 3, to reduce the load at the press-fitting to a certain degree while enhancing the strength of the connection between the developing sleeve 132 and the press-fit member (135, 140, or 135-1), the press-fit margin Δt is 10 μm or 30 μm, which is in the above-described desirable range (from 10 μm to 30 μm). In embodiments 1 through 8, the grooves (135c, 140c, or 135-1c) oblique to the axial direction and provided in the outer circumferential face of the columnar body (135a, 140a, or 135-1a) of the press-fit member (135, 140, or 135-1) can adsorb the deflection or deformation stilled caused by the load reduced by the desirable press-fit margin Δt. Additionally, since the grooves are oblique to the axis, the torque loaded to the connection between the developing sleeve 132 and the press-fit member during the rotation can be dispersed, and the higher degree of durability against the torque load can be attained.

By contrast, in comparative example 1 in which the outer circumferential face of the columnar body of the press-fit member is not grooved, galling arises at the connection between the developing sleeve 132 and the press-fit member, and deflection or deformation of the developing sleeve 132 resulting from the galling deteriorates the runout after the press-fitting. Additionally, in comparative example 2, galling arises between the grooves perpendicular to the axial direction, and deflection or deformation of the developing sleeve 132 resulting from the galling deteriorates the runout after the press-fitting. In comparative example 3, the grooves parallel to the axial direction receives a large torque in the direction perpendicular to the rotation, and the connection is broken eventually as image formation is repeated. Consequently, the runout increases after the breakage, which causes in image density unevenness.

Thus, from the evaluation results shown in table 1, it can be known that the groove oblique to the axial direction can adsorb deflection or deformation of the developing sleeve 132 that arises even when the press-fit margin Δt is set to the desirable range of 10 μm to 30 μm, and the runout in rotation can be suppressed. It can be further known that the durability against the torque load can be enhanced since the torque load is dispersed by the oblique groove. Additionally, from the embodiments 2 through 4, it can be known that, as long as the number of the grooves is identical and the press-fit margin Δt is equivalent, similar effects can be attained even when the width of the groove is different within a range from 1 mm to 5 mm and the angle from the axial direction is different within a range from 30° to 60°.

As described above, according to an aspect of the present invention, in a roller including a cylindrical body and a press-fit member fitted in at least one of openings on both ends of the cylindrical body, an outer circumferential face of the press-fit member that contacts an inner face of the cylindrical body is grooved obliquely to the axis of the cylindrical body, and, out of the inner face of the cylindrical body, at least a portion that contacts the outer circumferential face of the press-fit member is smooth without the groove.

In the roller according to the above-described aspect, the groove in the outer circumferential face of the press-fit member can adsorb load (such as deflection or deformation of the cylindrical body, galling, and the like) applied to the cylindrical body while the press-fit member is fitted therein. As a result, deflection, deformation, and galling of the cylindrical body can be suppressed, and accuracy in relative positions of the cylindrical body and the press-fit member can be enhanced.

Further, when the face of the cylindrical body is smooth in the connection between the cylindrical body and the press-fit member, the press-fit member can be fitted in the cylindrical body by simply being pressed thereinto. For example, although it is necessary to align the groove with the projection in a configuration in which the projection on the cylindrical body is fitted in the groove of the press-fit member, the present embodiment can obviate such alignment. Obviating such alignment contributes to improvement in the relative position accuracy between the cylindrical body and the press-fit member. In the roller according to the above-described aspect, the runout of roller can be suppressed as a result of improvement in the relative position accuracy.

Additionally, since the groove is oblique to the axis of the cylindrical body, the torque loaded to the connection between the cylindrical body and the press-fit member can be dispersed along the oblique groove. Accordingly, the torque loaded to the connection can be alleviated. Thus, the durability against the torque load can be enhanced without using glue.

It is to be noted that, although the press-fit members according to the above-described embodiments are fitted in both ends of the cylindrical body in the embodiments described above, use of one press-fit member according to the above-described embodiment can attain the effect of reducing the load during the press-fitting and enhancing the positional accuracy between the press-fit member and the cylindrical body.

For example, the press-fit member 135 stands from a press-fit flange. If the shaft stands, even when the number of time of falling is once, dimensional deviation is large at the end of the shaft. The falling of the shaft can be inhibited by the press-fit member according to the above-described embodiments. If the shaft stands on only one side, depending on the demanded component accuracy, a conventional press-fit member may be used, instead of the press-fit member 140, on the other side where the shaft does not stands.

Needless to say, when both of the press-fit members 135 and 140 (or variations thereof) are used, coaxial accuracy between the cylindrical body and the through hole of the press-fit member 140 penetrated by the shaft can be enhanced.

The above-described embodiments are representatives, and the present invention is not limited thereto. Numerous additional modifications and variations are possible in light of the above teachings and known arts. It is therefore to be understood that, within the scope of the appended claims, the disclosure of this patent specification may be practiced by those skilled in the art otherwise than as specifically described herein. Such modifications and variations having the configurations specified by the appended claims are within the scope of the present invention.

What is claimed is:

1. A roller comprising:
    a cylindrical body including a core and first and second openings on respective ends of the cylindrical body;
    a first press-fit member fitted in the first opening of the cylindrical body with an outer circumferential face thereof in contact with an inner face of the cylindrical body; and
    a second press-fit member fitted in the second opening of the cylindrical body, the core penetrating through a center portion of the second press-fit member,
    wherein the outer circumferential face of the press-fit member is grooved obliquely to an axis of the cylindrical body, and
    the inner face of the cylindrical body is smooth at least in a portion that contacts the outer circumferential face of the press-fit member.

2. The roller according to claim 1, wherein at least a single spiral groove is in the outer circumferential face of at least one of the first and second press-fit members.

3. The roller according to claim 1, wherein multiple grooves oblique to the axis of the cylindrical body are in the outer circumferential face of at least one of the first and second press-fit members.

4. The roller according to claim 1, wherein at least one of the first and second press-fit members receives rotational driving force to rotate the roller around the axis, and the outer circumferential face of the at least one of the first and second press-fit members is grooved in a direction such that the at least one of the first and second press-fit members enters the cylindrical body with rotation of the roller by the rotational driving force.

5. A developing roller comprising:
    a cylindrical body to bear developer on a circumferential face thereof, the cylindrical body including a core and first and second openings on respective ends of the cylindrical body;
    a first press-fit member fitted in the first opening of the cylindrical body with an outer circumferential face thereof in contact with an inner face of the cylindrical body; and
    a second press-fit member fitted in the second opening of the cylindrical body, the core penetrating through a center portion of the second press-fit member,
    wherein the outer circumferential face of the press-fit member is grooved obliquely to an axis of the cylindrical body, and
    the inner face of the cylindrical body is smooth at least in a portion that contacts the outer circumferential face of the press-fit member.

6. A developing device to develop an electrostatic latent image on an image bearer with developer, the developing device comprising the developing roller according to claim 5.

7. A process cartridge removably installed in an apparatus body, the process cartridge comprising the developing device according to claim 6.

8. An image forming apparatus comprising:
    an image bearer on which an electrostatic latent image is formed; and
    a developing device to develop the electrostatic latent image with developer, the developing device including a developing roller,
    the developing roller including:
        a cylindrical body to bear developer on a circumferential face thereof, the cylindrical body including a core and first and second openings on respective ends of the cylindrical body;
        a first press-fit member fitted in the first opening of the cylindrical body with an outer circumferential face thereof in contact with an inner face of the cylindrical body; and
        a second press-fit member fitted in the second opening of the cylindrical body, the core penetrating through a center portion of the second press-fit member,
    wherein the outer circumferential face of the press-fit member is grooved obliquely to an axis of the cylindrical body, and
    the inner face of the cylindrical body is smooth at least in a portion that contacts the outer circumferential face of the press-fit member.

* * * * *